US00H002102H

(19) United States

(12) Statutory Invention Registration (10) Reg. No.: US H2102 H

Uhm (43) Published: May 4, 2004

(54) CONTAMINATION CONTROL OF GASEOUS EMISSIONS BY CORONA-DISCHARGE GENERATION OF PLASMA

(75) Inventor: Han S. Uhm, Potomac, MD (US)

(73) Assignee: The United States of America as represented by the Secretary of the Navy, Washington, DC (US)

(21) Appl. No.: 09/086,990

(22) Filed: May 29, 1998

Related U.S. Application Data

(63) Continuation-in-part of application No. 08/669,687, filed on Jun. 24, 1996, now Pat. No. 5,830,328.

(51) Int. Cl.[7] ..... H05F 3/00

(52) U.S. Cl. ..... 204/164; 204/179; 422/186.21; 588/227

(58) Field of Search ..... 204/164, 165, 204/179; 422/186.21; 588/227

(56) References Cited

U.S. PATENT DOCUMENTS 5,137,701 A 8/1992 Mundt
5,366,701 A * 11/1994 Taylor et al. ..... 422/186.21
5,458,748 A * 10/1995 Breault et al. ..... 204/179
5,468,356 A 11/1995 Uhm
5,830,328 A 11/1998 Uhm

* cited by examiner

*Primary Examiner*—Michael J. Carone
*Assistant Examiner*—M. Thomson
(74) *Attorney, Agent, or Firm*—Jacob Shuster

(57) ABSTRACT

Contaminants within the gaseous emission discharged from an incinerator are eliminated during passage in parallel through reactor chambers by chemical reaction induced during exposure to plasma generated within said chambers. The plasma is generated by corona-discharge breakdown of electric fields established about electrodes within the reactor chambers upon supply thereto of electrical pulse voltage exceeding a critical field breakdown value inversely proportional to a high chamber temperature of the gaseous emission under atmospheric pressure within the reactor chambers.

10 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CONTAMINATION CONTROL OF GASEOUS EMISSIONS BY CORONA-DISCHARGE GENERATION OF PLASMA

The present invention relates generally to the elimination of contaminants from gaseous emissions by exposure to the decomposing action of plasma, and is a continuation-in-part of prior application Ser. No. 08/669,687, filed Jun. 24, 1996, now U.S. Pat. No. 5,830,328 issued Nov. 8, 1998.

BACKGROUND OF THE INVENTION

The elimination of contaminants from gaseous emissions by exposure to plasma under controlled conditions, is generally known in the art as disclosed for example in U.S. Pat. No. 5,137,701 to Mundt and in applicant's prior U.S. Pat. No. 5,468,356. The plasma according to such prior art disclosures is generated by use of microwave radiation. It is also generally known that such plasma may be generated by a corona discharge process that is relatively costly, involving impact ionization of neutrals by electrons accelerated by a high level electric field within a gaseous medium. It is therefore an important object of the present invention to provide a less costly method of eliminating contaminants from gaseous emissions by exposure to a plasma during its generation by a corona discharge process.

SUMMARY OF THE INVENTION

Pursuant to the present invention, a corona discharge system is utilized to generate plasma for elimination of contaminants such as air polluting oxides within emission gas discharged from hot chamber incinerators. Use of the corona discharge system is rendered economically suitable because of reduced and less costly power consumption associated with the generation of plasma to which the contaminants are exposed. Such corona discharge system involves the supply of electrical pulse energy, in excess of a critical voltage level, for breakdown of an electric field initially established within a reactor chamber through which the gaseous emission is conducted under atmospheric pressure and a high temperature. Plasma generation in response to such electric field breakdown within the hot reaction chamber is thereby effected more efficiently than in a cold chamber in view of a drastic decrease in the required electrical energy consumption for corona discharge with increase in temperature.

BRIEF DESCRIPTION OF DRAWING FIGURES

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENT

Figure 1:
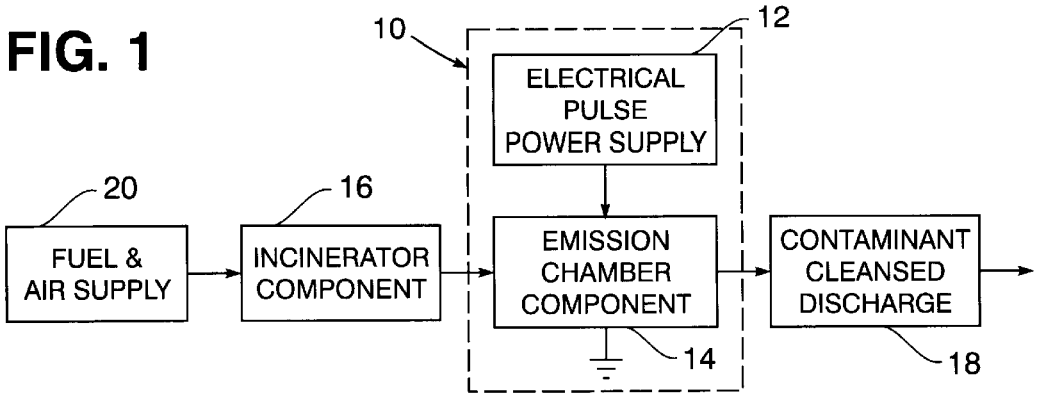
FIG. 1 is a block diagram illustrating the system associated with the present invention.

Referring now to the drawing in detail, FIG. 1 diagrams a corona discharge control system generally referred to by reference numeral 10, having an electrical pulse power supply 12 operationally connected to an emission chamber component 14. Pursuant to the present invention, the gas emission from an incinerator component 16 embodied in or associated with equipment or devices is decontaminated during passage through the emission chamber component 14 of the system 10 to provide a contaminant cleansed discharge 18 as diagrammed in FIG. 1. Such discharge 18 is in the form of a clean air emission where fuel and air from a supply 20 undergoes burning in the incinerator component 16.

Figure 2:
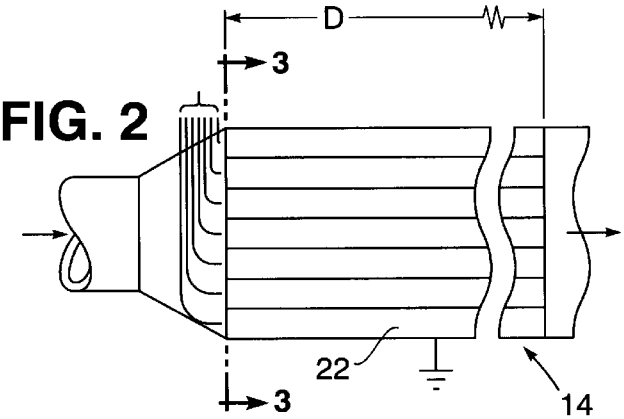
FIG. 2 is a partial side elevation view of the emission chamber component of the system diagrammed in FIG. 1, pursuant to one embodiment of the invention.
Figure 3:
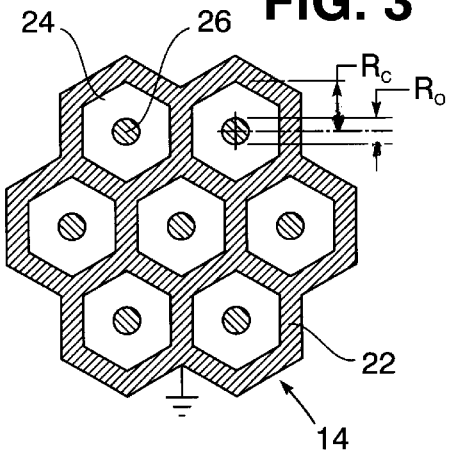
FIG. 3 is a transverse section view taken substantially through a plane indicated by section line 3—3 in FIG. 2.

A gas emission from the incinerator component 16 maintained at a relatively high temperature (T) passes through the emission chamber component 14 having a flow passage length (D) as denoted in FIG. 2. As shown in FIG. 3, the flow passage through chamber component 14 is enclosed within an electrically grounded housing 22 divided into a plurality of reactor chambers 24 of equal cross-sectional area dimensionally characterized by a chamber radius of ($R_c$). Each chamber 24 has an electrode rod 26 extending centrally therethrough between opposite axial ends along the entire flow passage length (D). The electrode rods 26 have equal circular cross-sectional areas of a radius of (Ro). Each rod 26 is electrically connected to an electrical power source associated with the electrical pulse supply 12 so as to apply a high voltage (V) to the rod 26 at time (t)=0. The voltage pulse [V(t)] so applied, generates an electric field which extends about the electrode 26 within its chamber 24. Such electric field has a magnitude [E(t)] sufficiently higher than the field breakdown level (Ed) to generate a high density plasma by corona discharge from each electrode rod 26. The plasma so generated and propagated from each rod 26 to the radially outer conductive walls of housing 22 within each chamber 24, has an electrical conductivity that is so large, because of the correspondingly high plasma density, that a negligible electrical resistance is exhibited.

Because of the high voltage pulse [V(t)] applied to each electrode 26 as aforementioned, the ionization front of electric field breakdown and the resulting corona discharge occurs at a location of increasing radius (r) about the electrode 26. The electric field magnitude at such ionization front is expressed as:

$$E(r_i) = \frac{2q}{R_c r_i} \tag{1}$$

where (q) represents the line charge density at the ionization front and ($r_i$) is the normalized radial coordinate of such ionization front between rod and chamber radii (Ro) and ($R_c$). The radial coordinate (r) is normalized by the chamber radius ($R_c$). The line charge density (q) is related to the pulse voltage V(t) by the expression:

$$q(r_i, t) = -\frac{V(t)}{2\ln(r_i)} \tag{2}$$

The corona discharge plasma is generated only when ionization dominates the electron-attachment process. Therefore, the electron density plays a pivotal role in plasma generation and behavior together with the electric field breakdown represented by a breakdown parameter (u) defined by:

$$u(t) = 10^{-4}\frac{V(t)}{R_c p} \tag{3}$$

where (p) is the pressure in the reactor chambers 24. A critical breakdown parameter (Uc) as a necessary condition for corona discharge is obtained in terms of ionization-front radius ($r_i$), expressed as:

$$Uc = -2.57 r_i \ln(r_i) \tag{4}$$

It was found that (Uc) increases from zero to reach a maximum peak value of 0.945 at an ionization-front radius ($r_i$) equal to 0.368, and then decreases as ($r_i$) increases from zero to unity. Thus, plasma generation occurs only when the breakdown parameter U(t) at the ionization front is larger than its critical value (Uc) as expressed in equation (4) in terms of the ionization-front radius ($r_i$), the mean free path of electrons symbolized as (l) also expressed in equation (2), and its neutral number density (n), expressed as:

$$V(t) = 10^4 R_c U \frac{n}{n_r} \tag{5}$$

The neutral density at room temperature and one atmospheric pressure, expressed in equation (5) as ($n_r$), was found to be $2.5\times10^{19}$ particles per $cm^3$. According to the simple ideal gas law:

$$pv = nkT \tag{6}$$

where (v) is the volume of the chambers 24 within system 10, (k) is a constant and (T) is the temperature of the emission gas within the chambers 24. With the pressure (p) of one atmosphere being maintained constant throughout emission gas burning, equation (6) indicates that the neutral density (n) is inversely proportional to temperature (T), so that by elimination of (n) in favor of temperature (T) a critical voltage (Vc) for corona-discharge breakdown is obtained, expressed as:

$$Vc = 10^4 R_c Uc \frac{Tr}{T} \tag{7}$$

where Tr=300° K. is the room temperature and (Vc) is inversely proportional to temperature (T) of the reactor chambers 24. Thus, plasma generation by corona discharge is facilitated in chambers 24 under a temperature (T) that is higher than the normal or prevailing environmental room temperature (Tr).

It was also found that most of the energy consumption for corona discharge plasma generation is contributed by the electrical energy stored in emission chamber component 14. Therefore, the electrical energy (Wc) required for corona discharge breakdown is approximated by the equation:

$$Wc(r_i) = -1.9\times10^3 R_c^2 \frac{Tr^2}{T^2} r_i^2 \ln(r_i) \tag{8}$$

Figure 4:
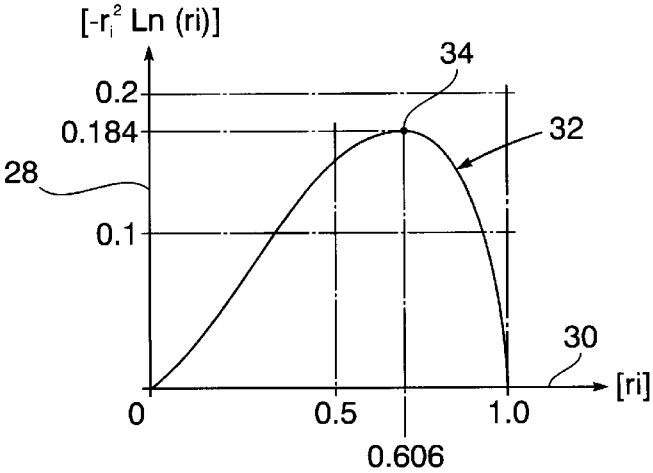
FIG. 4 is a graphical representation of certain relationships underlying the operational conditions associated with the system diagrammed in FIGS. 1–3.

FIG. 4 illustrates a graphical plot 32 of the function [$-r_i^2\ln(r_i)$] from equation (8), along an ordinate 28 versus the ionization-front radius ($r_i$) as the abscissa 30. The plotted function 32 has a maximum peak 34 at a value of ½e=0.184 for a radius ($r_i$) of a value $e^{-1/2}$=0.606, where (e) is the base of the natural logarithm equal to 2.718. Based on the foregoing function plot 32, it is evident that electrical energy must be continuously pumped into the emission chamber component 14 of the system 10 for corona discharge breakdown until the ionization-front radius ($r_i$) reaches 0.606. Beyond such radius, corona-discharge breakdown will continue without the same input of energy by an appropriate choice of profile for variation of voltage-pulse [V(t)] closely tailored to the critical voltage (Vc). Thus, corona-discharge breakdown will continue as the stored energy decreases, as long as the radius ($r_i$) is comfortably less then unity (1.0), to avoid short circuitry and waste of energy during the later portion of each voltage pulse duration.

In summary, it should be apparent from the foregoing description that the input of critical voltage (Vc) required for corona-discharge breakdown as expressed in equation (7) is inversely proportional to chamber temperature (T) so that it is reduced by increase in temperature (T). The electrical energy (Wc) required for corona-discharge breakdown, as expressed in equation (8) on the other hand, is inversely proportional to the square of chamber temperature (T) so that electrical energy consumption decreases drastically as temperature (T) is increased. For example, the voltage (Vc) required at temperature of T=627° C. is about one-third of that for a room temperature (Tr) in the reactor chambers 24 evidencing a significant increase in efficiency of plasma generation by corona discharge in a hot chamber as compared to a cold chamber. Also because of the proportional relationships of pulse voltage [V(t)] and energy (Wc) to chamber radius ($R_c$) as expressed in equations (7) and (8), the emission chamber component 14 may be subdivided into a plurality of the reactor chambers 24 of honeycomb cross-sectional shape according to the embodiment shown in FIG. 3, with the high voltage electrode rods 24 centrally located therein to reduce the voltage requirement.

Obviously, other modifications and variations of the present invention may be possible in light of the foregoing teachings. It is therefore to be understood that within the scope of the appended claims the invention may be practiced otherwise than as specifically described.

What is claimed is:

1. In a method of eliminating contaminants from a gaseous emission by generation of a plasma to which the gaseous emission is exposed for promoting chemical reaction of the contaminants, the improvement residing in the steps of: conducting the gaseous emission during discharge thereof through a reactor chamber to which said plasma is confined; supplying electrical energy to the reactor chamber for establishment of an electrical field therein; and controlling said supply of the electrical energy to the reactor chamber for breakdown of the electrical field therein to effect said generation of the plasma by corona discharge within the reactor chamber.

2. In a method of eliminating contaminants from a gaseous emission by generation of a plasma to which the gaseous emission is exposed for promoting chemical reaction of the contaminants, the improvement residing in the steps of: conducting the gaseous emission during discharge thereof through a reaction chamber under atmospheric pressure and at a temperature substantially elevated above 300° K.; supplying electrical energy to the reactor chamber for establishment of an electrical field therein; and controlling said supply of the electrical energy to the reactor chamber for breakdown of the electrical field therein to effect said generation of the plasma by Corona discharge within the reactor chamber to which the plasma is confined.

3. The improvement as defined in claim 2 wherein said step of supplying the electrical energy includes: applying an electrical pulse voltage to the reactor chamber at a location therein from which the plasma is propagated.

4. The improvement as defined in claim 3 wherein said electrical pulse voltage exceeds a critical value at which said breakdown of the electrical field occurs along an ionization front that is displaced radially from said location during said supply of the pulse voltage.

5. The improvement as defined in claim 1 wherein said step of supplying the electrical energy includes: applying an electrical pulse voltage to the reactor chamber at a location therein from which the plasma is propagated.

6. The improvement as defined in claim 5 wherein said electrical pulse voltage exceeds a critical value at which said breakdown of the electrical field occurs along an ionization front that is displaced radially from said location during said supply of the pulse voltage.

7. In a method of eliminating contaminants from a gaseous emission discharged from an incinerator by generation of a plasma to which the contaminants in the emission are exposed for promoting chemical reaction thereof, the improvement residing in the steps of: conducting the gaseous emission during said discharge from the incinerator for passage through a reactor chamber to which said plasma is confined; and supplying electrical energy to the reactor chamber for effecting said generation of the plasma therein during said passage of the gaseous emission therethrough.

8. The improvement as defined in claim 7 wherein said step of supplying the electrical energy includes: applying an electrical pulse voltage to a location within the reactor chamber at which an electrical field is established, said pulse voltage reaching a maximum level in excess of a critical value causing breakdown of the electrical field at said location within the reactor chamber from which the plasma is generated along an ionization front displaced in radial relation to passage of the gaseous emission through the reactor chamber.

9. The improvement as defined in claim 8 wherein the gaseous emission during passage through the reactor chamber is under atmospheric pressure and at a temperature substantially elevated above 300° K.

10. The improvement as defined in claim 7 wherein the gaseous emission during passage through the reactor chamber is under atmospheric pressure and at a temperature substantially elevated above 300° K.

* * * * *